United States Patent [19]

Grossmann et al.

[11] Patent Number: 5,186,685
[45] Date of Patent: Feb. 16, 1993

[54] FLANGE MOUNTING ARRANGEMENT

[75] Inventors: Horst Grossmann, Huenfelden; Jurgen Hoser, Neu-Ansbach, both of Fed. Rep. of Germany

[73] Assignee: Black & Decker, Inc., Newark, Del.

[21] Appl. No.: 663,330

[22] Filed: Mar. 1, 1991

[30] Foreign Application Priority Data

Mar. 2, 1990 [DE] Fed. Rep. of Germany ....... 9004690

[51] Int. Cl.⁵ ................................................. F16D 7/02
[52] U.S. Cl. .................................................... 464/46
[58] Field of Search ....................... 464/46, 45, 47; 403/316, 317, 318, 326; 192/56 R

[56] References Cited

U.S. PATENT DOCUMENTS

| | | | |
|---|---|---|---|
| 2,436,418 | 9/1943 | Bradford | 464/46 X |
| 3,287,935 | 6/1964 | Grünbaum | 464/47 |
| 3,290,071 | 11/1964 | Kusiak | 403/316 |
| 3,605,443 | 9/1971 | Redelman | 464/46 |
| 3,831,401 | 8/1974 | Hurwitz | 464/46 X |
| 3,877,827 | 4/1975 | Adelizzi | 403/318 X |
| 4,232,978 | 11/1980 | Cohen | 403/317 |
| 4,706,801 | 11/1987 | Vessey | 464/46 X |
| 4,813,303 | 3/1989 | Beezer et al. | 464/46 X |

*Primary Examiner*—Daniel P. Stodola
*Attorney, Agent, or Firm*—Dennis A. Dearing; Charles E. Yocum; Edward D. C. Bartlett

[57] ABSTRACT

A flange mounting arrangement comprises a flange member non-rotatably mounted on a shaft. The flange member (2) fits around an interrupted collar (6) and comprises a lug (7) which projects through the collar (6) into a recess (5) on the shaft. The arrangement may form part of an overload clutch for example in a hand held power tool.

11 Claims, 2 Drawing Sheets

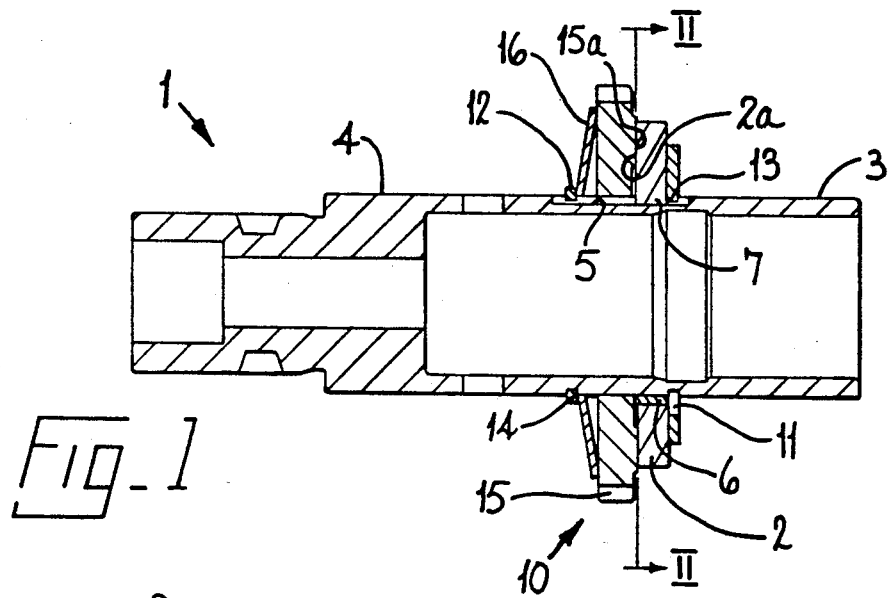
Fig._1
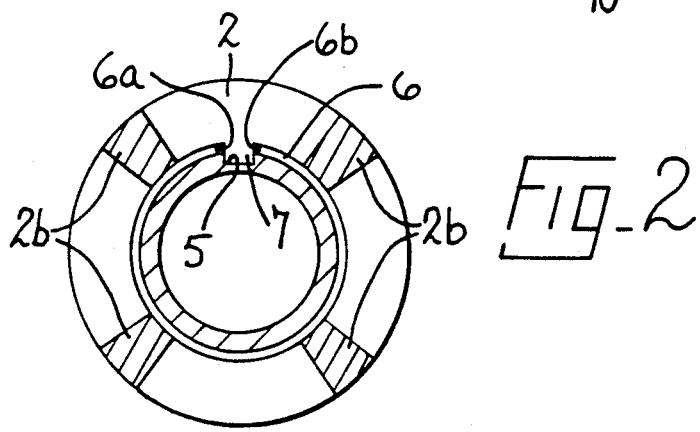
Fig._2
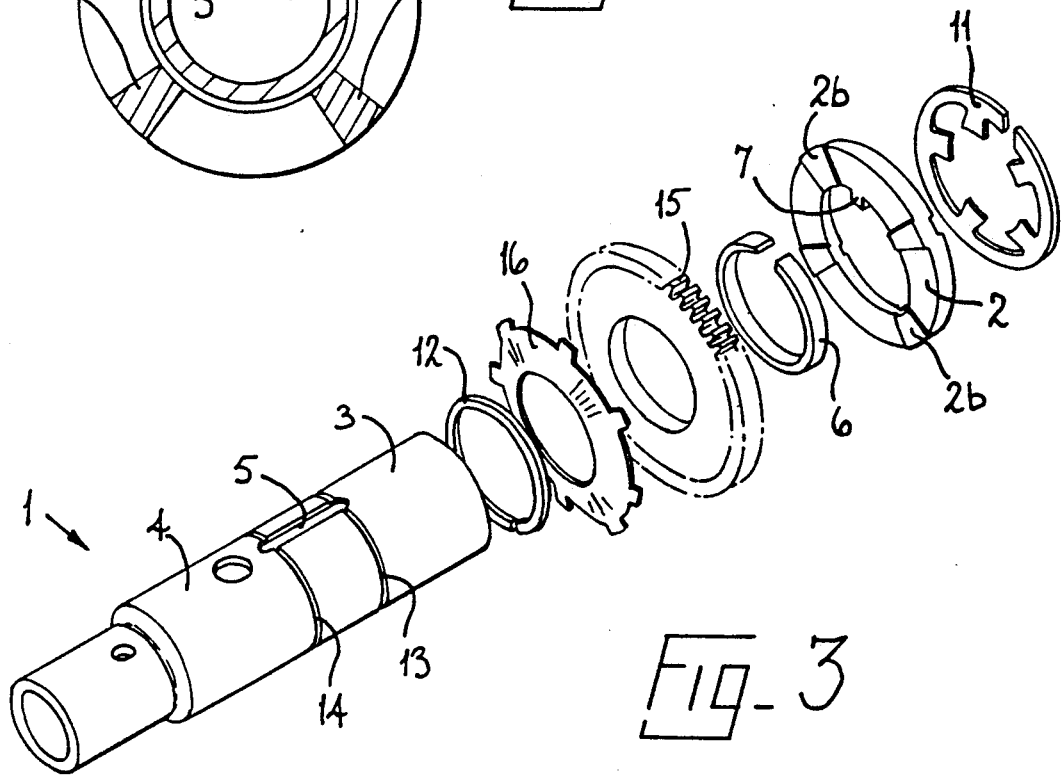
Fig._3

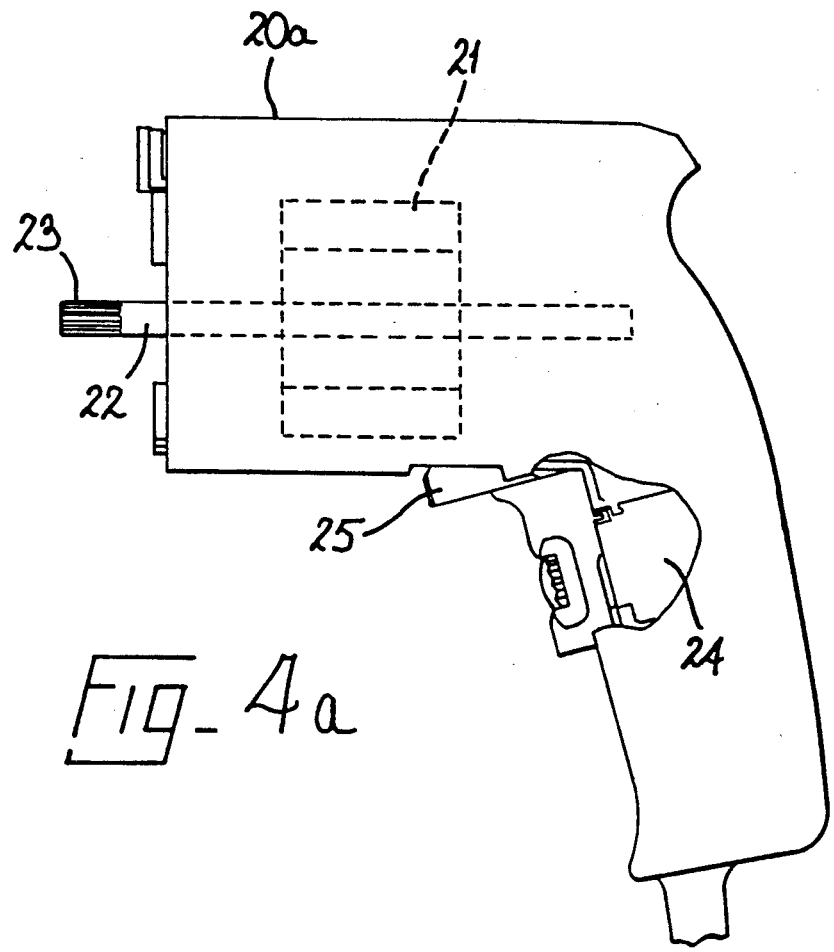
Fig_4a
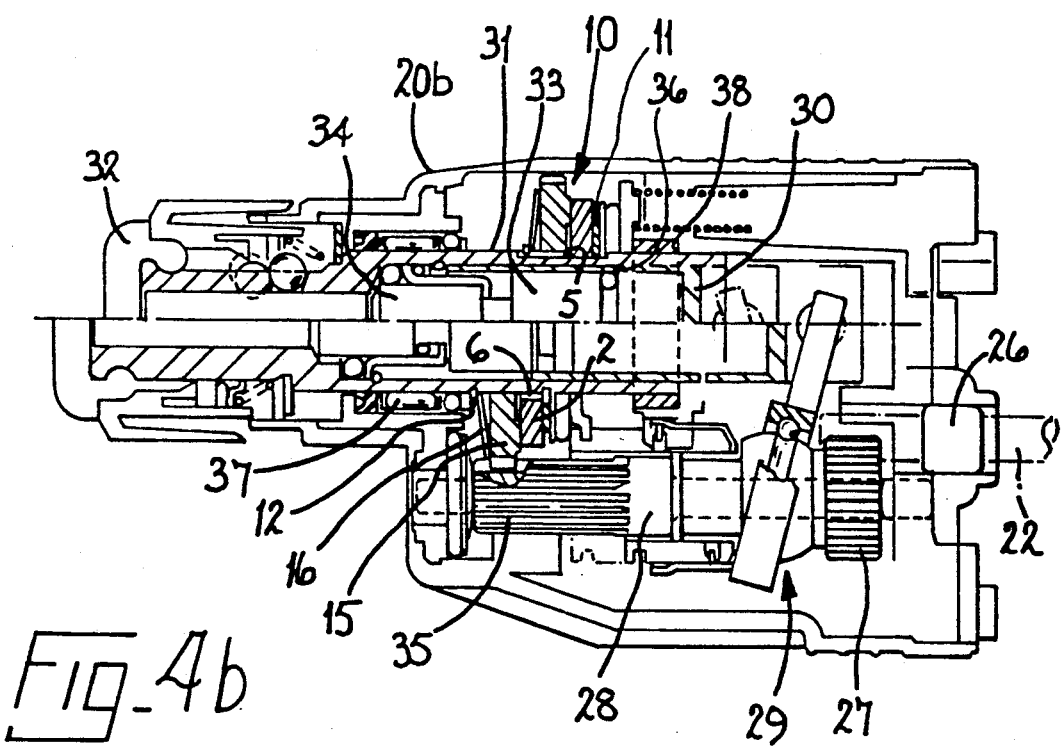
Fig_4b

FLANGE MOUNTING ARRANGEMENT

This invention relates to a flange mounting arrangement for mounting a flange non-rotatably on a shaft.

FIELD OF THE INVENTION

It also relates to an overload clutch incorporating such an arrangement and to power tools incorporating such arrangements.

BACKGROUND OF THE INVENTION

In the past, flanges have been mounted non-rotatably on shafts in a variety of ways which have either involved providing protuberances on the mounting surface of the shaft or grooves extending from one end of the shaft to the flange location.

SUMMARY OF THE INVENTION

It is an object of the present invention to provide a non-rotatable mounting for a flange on a shaft which permits the flange to be mounted without affecting the surface at opposite sides thereof.

To this end, according to the invention, there is provided a flange mounting arrangement for mounting a flange member non-rotatably on shaft, comprising a shaft having a recess in its surface intermediate bearing surface portions thereof, an interrupted collar located on the shaft with its opposite ends adjacent opposite sides of the recess, an annular flange member dimensioned to fit around said collar and having a radially inwardly directed lug or tooth engaging said recess through the gap between the ends of the collar, the radially inward extent of the lug being greater than the radial thickness of the collar but less than twice the thickness of the collar and the recess extending axially beyond at least one side of the collar by at least the axial thickness of the flange.

With such an arrangement the flange member may be mounted on the shaft by sliding it off-centre along the shaft until it is next to the collar and the lug can enter the recess whereupon the flange member can be arranged concentrically of the shaft and positioned over the collar. The flange member is retained against rotation about the shaft by the lug engaging in the recess.

The flange member, collar and shaft may have a sufficiently tight fit that the flange member is restrained against axial movement by friction. However, it is preferred that the flange member be suitably restrained against axial movement such as by stop members engaging in recesses at opposite sides of the flange member. These may for example comprise circlips engaging in circumferential grooves at each side of the flange.

An arrangement according to the invention permits the shaft to be fabricated without any protuberances and with the bearing surface portions of the shaft of greater diameter than any other portion of the shaft. Manufacture is thus simplified and its cost reduced. In particular the bearing surface portions of the shaft may be ground and polished by a relatively fast inexpensive axial flow grinding and polishing process. Furthermore the flange member can be mounted intermediate two bearing surfaces on the shaft without interrupting or otherwise affecting the bearing surfaces at all. Thus by ensuring that there are no recesses in the shaft in the area of the bearing surfaces the operation and life of the bearings is improved. Additionally, the arrangement according to the invention may reduce the weakening of a shaft in the form of a thin-walled tube that may occur with prior art arrangements.

In one embodiment of the invention, the flange member may comprise the output member of an overload clutch having an input member consisting of flange member rotatably mounted on the shaft, said members being pressed together in driving engagement by spring means whereby said members will disengage at a predetermined torque.

Thus, from another aspect, the invention provides an overload clutch comprising a shaft having a recess in its outer surface intermediate its ends, an interrupted collar located on the shaft with its opposite ends adjacent opposite sides of the recess, an output member comprising a first annular flange member dimensioned to fit around said collar and having a radially inwardly directed lug engaging in said recess through the gap between the ends of the collar, the radially inward extent of the lug being greater than the radial thickness of the collar but less than twice the thickness of the collar and the recess extending axially beyond one side of the collar by at least the axial thickness of the flange member, an input member comprising a second annular flange member rotatably mounted on the shaft alongside said first annular flange member, and a spring arranged to press said members together in driving engagement whereby said members will disengage at a pre-determined torque.

Such an overload clutch according to the invention preferably includes ramped engagement means on the facing surfaces of said flange members, said flange members being pressed together by an annular leaf spring mounted on the shaft next to the input member, and the second annular flange member may comprise a gear. The clutch elements are suitably held in position by stop members at each side thereof such as circlips engaging in circumferential grooves in the shaft and respectively bearing on the leaf spring and the first annular flange member.

From a further aspect, the invention also provides a power tool, such as a rotary hammer, incorporating an overload clutch as described above.

BRIEF DESCRIPTION OF THE DRAWINGS

In order that the invention may be more readily understood, reference will now be made to the accompanying drawings, in which:

FIG. 1 is an axial cross section through one embodiment of flange mounting arrangement according to the invention comprising a flange member which forms one element of an overload clutch;

FIG. 2 is a section along the line II—II of FIG. 1;

FIG. 3 is an exploded perspective view of the arrangement shown in FIGS. 1 and 2; and FIGS. 4a and 4b are respectively cross sections through the rear and front sections of a rotary hammer incorporating an overload clutch as illustrated in FIGS. 1 to 3, the section shown in FIG. 4b being shown on a larger scale and from the opposite side to the view shown in FIG. 4a.

DETAIL DESCRIPTION OF THE PREFERRED EMBODIMENTS

Referring to FIGS. 1 to 3 of the accompanying drawings there is shown one embodiment of overload clutch incorporating a flange mounting arrangement according to the invention. For the purposes of explanation the flange mounting arrangement will be described first.

The flange mounting arrangement illustrated comprises a shaft 1 having a flange member 2 mounted thereon intermediate bearing surfaces 3, 4 of the shaft. The shaft 1 has an axially extending recess 5 in its surface intermediate the bearing surfaces 3, 4. An interrupted collar 6 is located on the shaft with its opposite ends 6a, 6b adjacent opposite sides of the recess 5 are shown in FIG. 2. The annular flange member 2 is dimensioned to fit around the collar 6 and has a radially inwardly directed lug or tooth 7 which engages in the recess 5 through the gap between the ends 6a, 6b of the collar 6. In order that the lug shall engage in the recess its radial inward extend is greater than the radial thickness of the collar 6 but so that the flange member 2 may be slid along the shaft 1 for mounting it as described below the radial inward extent of the lug 7 must be less than twice the thickness of the collar. The recess 5 is essentially the same width as the lug 7 so that the flange member 2 is restrained against rotational movement with respect to the shaft 1. The radial extent of the recess 5 is at least twice the axial thickness of the flange so that the flange member may be positioned for fitting on the collar as described below but need be no longer.

In a simple form of flange mounting according to the invention the flange member may be restrained against axial movement on the shaft by suitable stop members such as circlips engaging in circumferential recesses at each side of the flange members. In the embodiment illustrated the flange member 2 forms part of an overload clutch 10 and the circlips 11, 12 which engage in recesses 13, 14 on the shaft 1 respectively do not both directly engage the flange member.

With such an arrangement the flange member 2 may be mounted on the shaft 1 in a simple manner in the following way. Firstly the collar 6 is slid over the end of the shaft and positioned where the flange member is to be mounted with its ends 6a, 6b at opposite sides of the recess or groove 5. Next the flange member 2 is slid off-centre along the shaft until it is next to the collar 6 and the lug 7 can enter the groove 5 whereupon the flange member 2 can be arranged concentrically of the shaft and positioned over the collar 6. The flange member 2 is restrained against rotation about the shaft by the lug 7 engaging in the recess 5. It will be understood that the dimensions set for the lug are such that the flange member must be able to slide over the shaft while in its mounting position the lug will engage in the recess. Also it will be understood that the groove 5 must extend beyond the position in which the flange member is to be fitted sufficiently for the flange member to be arranged concentrically of the shaft before it is engaged over the collar 6.

It will be appreciated that in the embodiment illustrated in FIGS. 1 to 3, the flange mounting arrangement of this invention forms part of an overload clutch 10 through which the shaft 1 may be driven by a drive gear (not shown) through an input drive gear 15. The input drive gear 15 is in the form of an annular flange member which is rotatably mounted on the shaft 1 and pressed into driving engagement with the flange member 2 by means of a spring 16 which in this embodiment is in the form of an annular leaf spring mounted on the shaft 1 next to the gear 15. The opposing faces 2a, 15a of the flange member 2 and the gear 15 carry ramped projections 2B and 15A respectively which inter-engage to transmit the driving force. The pressure of the spring 16 is chosen so that the flange member 2 and gear 15 disengage so that the drive is interrupted upon at a predetermined torque, for example 16 Nm.

As can be seen in the drawing, the elements of the clutch assembly are restrained axially by the circlips 11, 12 referred to above. The circlip 11 engages against the outer face of the flange member 2 while the circlip 12 engages the spring 16.

FIGS. 4a and 4b illustrate and embodiment of power tool, specifically a rotary hammer, incorporating an over-load clutch having the flange mounting arrangement of this invention. The hammer includes a housing in two parts 20a and 20b each of which parts is formed in two clam shell sections in conventional manner. As shown in FIG. 4a, the hammer includes a motor 21 driving a drive shaft 22 having a gear 23 on its forward end and incorporates a trigger-operated switch 24 which can be set for forward or reverse drive by an actuator 25.

With reference to FIG. 4b, the forward end of the drive shaft engages in a bearing 26 and in the gear 23 engages a gear 27 on an intermediate shaft 28. The intermediate shaft 28 carried a swash plate drive 29 which drives a hollow piston 30 of the rotary hammer mechanism. The hollow piston 30 is mounted for sliding axial movement in a hollow guide shaft 31 which carries a chunk 32 of the hammer at its forward end. The chuck 32 is designed to receive bits of the so-called SDS type which are able to reciprocate within the chuck. Within the hollow piston 30 is arranged a ram 33 and as the hollow piston is reciprocated the ram 33 is driven backwards and forwards so as to repeatedly strike a beat piece 34 which is thereby constrained to strike the rear end of a bit mounted in the chuck 32 to effect the hammer action.

Rotation of the bit is effected by rotating the hollow guide shaft 31 via a gear 15 which is driven off a gear 35 at the front end of the intermediate shaft 28. It will be noted that in the drawings the rotary hammer mechanism id divided longitudinally to show the positions of the various reciprocating elements both in the forward (lower part) and rearward (upper part) positions thereof.

The gear 15 forms part of an override clutch according to the present invention and further includes a flange member 2 mounted on the guide shaft 31 through the intermediary of the collar 6 in the manner illustrated in the FIGS. 1 to 3, the clutch also incorporating an annular leaf spring 16 with the elements of the clutch restrained by circlips 11, 12. To this end the shaft 31 is provided with an axial groove 5 for mounting the flange 2 in the manner previously described.

The arrangement illustrated operates as follows. When the switch 24 is actuated to start the motor the main drive shaft 22 is rotated causing rotation of the intermediate drive shaft 28. The swash plate drive causes reciprocation of the hollow piston 30 which repeatedly drives the ram 33 forwards to strike the beat piece 34 and transmits the hammer action to a bit mounted in the chuck 32. During this operation air is replenished in the hollow piston 30 through an air replenishment aperture 36 in known manner.

Simultaneously, the guide shaft 31 is rotated via the gear 35 on the intermediate shaft 28 and the gear 15 through the overload clutch 10. The overload clutch is set so as to disengage the drive at a predetermined torque, e.g. 16 Nm, for example upon the bit becoming held against rotation by the workpiece.

The guide shaft 31 is mounted in bearings 37, 38. The forward bearing 37 is shown as a needle bearing while the rearward bearing 38 is shown as a sintered bearing although this latter bearing may also be a needle bearing.

The outer bearing surface portions of the guide shaft 31 in the region of the bearings are uninterrupted so as to provide for the maximum life of the bearings which would not be possible where there is an interruption such as a groove in the surface area in contact with the bearings. It can be seen that in the construction described the two bearing surface portions of the shaft are both of the same diameter and of greater diameter than any other portion of the shaft. This enables the bearing surface portions of the shaft to be polished in an axial flow process thus simplifying and cost reducing its manufacture.

It will be understood that the embodiments described above are illustrative only and that various modifications and changes may be made to the specific details referred to herein without departing from the scope in the invention as defined in the appended claims.

We claim:

1. A flange mounting arrangement for mounting a flange member non-rotatably on a shaft, comprising:
   a rotatable shaft axially extending and having two axially spaced apart bearing surface portions for rotatably mounting the shaft thereon;
   the shaft having an axial recess in its surface intermediate said bearing surface portions; thereof;
   a collar partially encircling the shaft, the collar being discontinuous and having two opposite ends space apart circumferentially with a gap therebetween;
   an annular flange member dimensioned to fit radially over said collar and having a radially inwardly directed lug engaging the recess through the gap between the ends of the collar;
   the radial inward extent of the lug being greater than the radial thickness of the collar but less than twice the thickness of the collar;
   the recess extending axially beyond at least one side of the collar by at least the axial thickness of the flange member; and
   the flange member being mountable on the shaft by sliding the flange member along the shaft while the flange member is off-center with respect to the shaft until the flange member is next to the collar and the lug can enter the recess, whereupon the flange member can be arranged concentrically of the shaft and positioned over the collar.

2. A flange mounting arrangement as claimed in claim 1, in which the flange member, collar and shaft are tightly interfit such that the flange member is restrained against axial movement by friction.

3. A flange mounting arrangement as claimed in claim 1, in which the flange member is restrained against axial movement by stop members engaging in recesses at opposite sides of the flange member.

4. A flange mounting arrangement according to claim 3, in which the stop members comprise circlips engaging in circumferential grooves at opposite sides of the flange member.

5. A flange mounting arrangement as claimed in any one of the preceding claims, in which the bearing surface portions of the shaft at opposite sides of the flange member are of the same diameter which is greater than that of any other portion of the shaft.

6. A flange mounting arrangement as claimed in claim 1, in which the flange member comprises the output member of an overload clutch having an input member comprising a second flange member rotatably mounted on the shaft, said flange members being resiliently pressed together in driving engagement whereby said flange members will disengage at a predetermined torque.

7. An overload clutch comprising:
   a shaft having a recess in its outer surface intermediate its ends;
   an interrupted collar located on the shaft with its opposite ends adjacent opposite sides of the recess;
   an output member comprising a first annular flange member dimensioned to fit around said collar and having a radially inwardly directed lug engaging in said recess through the gap between the ends of the collar, the radially inward extent of the lug being greater than the radial thickness of the collar but less than twice the thickness of the collar and the recess extending axially beyond one side of the collar by at least the axial thickness of the flange;
   an input member comprising a second annular flange member rotatably mounted on the shaft alongside said first annular flange member, and
   a spring arranged to press said members together in driving engagement whereby said members will disengage at a predetermined torque.

8. An overload clutch as claimed in claim 7, including ramped projections on the facing surfaces of said annular flange members, said flange members being pressed together by an annular leaf spring mounted on the shaft next to the input member.

9. An overload clutch as claimed in claim 7 or 8, in which said second annular flange member comprises a gear.

10. An overload clutch as claimed in claim 8, including stop members engaging in recesses at opposite sides of said clutch, said spring engaging against the stop member at one side and said first annular member engaging against the stop member at the other side.

11. An overload clutch as claimed in claim 10, in which said stop members comprise circlips engaging in circumferential grooves in the shaft.

* * * * *